United States Patent
Sato et al.

(10) Patent No.: US 8,087,912 B2
(45) Date of Patent: Jan. 3, 2012

(54) CRANKSHAFT HAVING FIRST AND SECOND ECCENTRIC PORTIONS

(75) Inventors: Hajime Sato, Aichi-ken (JP); Yoshiyuki Kimata, Aichi-ken (JP)

(73) Assignee: Mitsubishi Heavy Industries, Inc., Tokyo (JP)

(*) Notice: Subject to any disclaimer, the term of this patent is extended or adjusted under 35 U.S.C. 154(b) by 199 days.

(21) Appl. No.: 12/007,901

(22) Filed: Jan. 16, 2008

(65) Prior Publication Data

US 2008/0173129 A1    Jul. 24, 2008

(30) Foreign Application Priority Data

Jan. 22, 2007   (JP) ................. 2007-011203

(51) Int. Cl.
| | |
|---|---|
| F01C 1/02 | (2006.01) |
| F01C 1/063 | (2006.01) |
| F01C 1/30 | (2006.01) |
| F01C 11/00 | (2006.01) |
| F04C 2/00 | (2006.01) |
| F04C 23/00 | (2006.01) |
| F04C 11/00 | (2006.01) |

(52) U.S. Cl. ................. 418/55.1; 418/5; 418/7
(58) Field of Classification Search .......... 418/5, 7, 418/11, 55.1
See application file for complete search history.

(56) References Cited

U.S. PATENT DOCUMENTS

| | | | | |
|---|---|---|---|---|
| 2,817,953 A | * | 12/1957 | Badalini ................. | 60/389 |
| 5,375,986 A | | 12/1994 | Ukai et al. | |
| 5,588,819 A | * | 12/1996 | Wallis ................. | 418/39 |
| 6,193,489 B1 | * | 2/2001 | Tarng et al. ............. | 418/55.6 |
| 6,658,866 B2 | * | 12/2003 | Tang et al. ............. | 418/6 |
| 2002/0114719 A1 | | 8/2002 | Itoh et al. | |
| 2004/0025629 A1 | * | 2/2004 | Poehlau ................. | 74/640 |
| 2004/0105770 A1 | * | 6/2004 | Sakamoto et al. ....... | 418/5 |
| 2005/0169788 A1 | * | 8/2005 | Komai et al. ............ | 418/55.1 |
| 2006/0097601 A1 | * | 5/2006 | Hauger .................. | 310/217 |
| 2009/0139262 A1 | * | 6/2009 | Takahashi et al. ....... | 62/468 |

FOREIGN PATENT DOCUMENTS

| | | | |
|---|---|---|---|
| DE | 3223897 A1 | * | 12/1983 |
| EP | 1 489 308 A2 | | 12/2004 |
| JP | 63-88289 A | | 4/1988 |
| JP | 5-87074 A | | 4/1993 |
| JP | 5-332275 A | | 12/1993 |
| JP | 9-203382 A | | 8/1997 |
| JP | 11-132170 A | | 5/1999 |

(Continued)

OTHER PUBLICATIONS

Search Report dated Apr. 21, 2008 issued in corresponding European Application No. 08150493.8.

(Continued)

*Primary Examiner* — Mary A Davis
(74) *Attorney, Agent, or Firm* — Westerman, Hattori, Daniels & Adrian, LLP

(57) ABSTRACT

A crankshaft is to be provided that allows its assembly process to be simplified, work hours required for the assembly process to be shortened and a manufacturing cost to be reduced. The crankshaft is provided with first eccentric section and second eccentric section at respective ends while interposing a shaft section therebetween and has such a shape that a peripheral edge of the first eccentric section and/or the second eccentric section is positioned radially inside of a peripheral edge of the shaft section.

3 Claims, 6 Drawing Sheets

FOREIGN PATENT DOCUMENTS

| | | | | |
|---|---|---|---|---|
| JP | 2001107881 | A | * | 4/2001 |
| JP | 2002-174186 | A | | 6/2002 |
| JP | 2002262496 | A | * | 9/2002 |
| JP | 2004-346791 | A | | 12/2004 |
| JP | 2005106046 | A | * | 4/2005 |
| JP | 2005201148 | | * | 7/2005 |
| JP | 2006-17100 | A | | 1/2006 |
| JP | 2006-46078 | A | | 2/2006 |
| JP | 2006-132332 | A | | 5/2006 |
| JP | 2006-170130 | A | | 6/2006 |
| JP | 2006-275033 | A | | 10/2006 |

OTHER PUBLICATIONS

Okamoto, Masakazu et al.; "Development of Two-Phase Flow Expander for Co2 Air-Conditioners"; Air Conditioning and Environmental Laboratories, Sakai, Osaka, 591-8511, Japan, 2005; pp. C315-1 to C315-4.

Japanese Office Action dated Jun. 3, 2011, issued in corresponding Japanese Patent Application No. 2007-011203.

* cited by examiner

CRANKSHAFT HAVING FIRST AND SECOND ECCENTRIC PORTIONS

BACKGROUND OF THE INVENTION

1. Field of the Invention

The present invention relates to a crankshaft having eccentric sections at both ends.

This application is based on Japanese Patent Application No. 2007-011203, the content of which is incorporated herein by reference.

2. Description of Related Art

As a crankshaft having eccentric sections respectively at both ends, there has been known one disclosed in Japanese Patent Application Laid-Open No. 2006-132332 for example.

However, the crankshaft disclosed in Japanese Patent Application Laid-Open No. 2006-132332 has required processes of preparing the crankshaft divided in the middle of the shaft in advance and of assembling the crankshaft again after inserting a motor rotor. Therefore, it has had problems that its assembly process is complicated, prolonging work hours required for the assembly process and increasing a manufacturing cost.

It also had a problem that strength of the crankshaft drops because it has the structure in which it is divided in the middle of the shaft.

Furthermore, it had such problems that it may cause decentering in the crankshaft and the performance of the crankshaft drops because it had the structure in which it is divided in the middle of the shaft.

BRIEF SUMMARY OF THE INVENTION

The present invention has been made in view of the circumstances described above and its main object is to provide a crankshaft that allows its assembly process to be simplified, work hours required for the assembly process to be shortened and its manufacturing cost to be reduced.

In order to solve the aforementioned problems, the following means have been adopted for the invention.

According to a first aspect of the invention, a crankshaft is provided with first and second eccentric sections at respective ends thereof while interposing a shaft section therebetween and has such a shape that a peripheral edge of the first/second eccentric section is positioned radially inside of a peripheral edge of the shaft section.

According to the crankshaft of the first aspect of the invention, it is possible to readily and quickly assemble (attach) a motor rotor to the shaft section of the crankshaft just by inserting the end of the side on which the eccentric section is formed so that its peripheral edge is positioned radially inside of the peripheral edge of the shaft section from one opening end of a center hole perforated through a center of the motor rotor for example.

Thereby, it is possible to simplify the assembly process, to shorten the work hours required for the assembly process and to reduce a manufacturing cost.

Still more, because the crankshaft is made monolithically, it is possible to prevent the strength of the crankshaft from dropping.

Furthermore, because the crankshaft is made monolithically and causes no decentering, it is possible to eliminate a drop of performance and reliability that are otherwise caused by the decentering.

In the crankshaft described above, preferably an angle formed between a line connecting a center axial line of the first eccentric section and a center axial line of the shaft section and a line connecting a center axial line of the second eccentric section and the center axial line of the shaft section is set so as to be substantially zero degree (±5 degrees, preferably zero degree) within a same plane.

Such crankshaft allows a dynamic balance of its shaft system to be readily balanced and a swing of the crankshaft that may be otherwise caused by its dynamic unbalance to be prevented in processing the crankshaft.

Thereby, it becomes possible to improve the processability of the crankshaft, to process the crankshaft accurately, to improve the performance and reliability and to reduce the processing cost.

Preferably, the center axial line of the first eccentric section is disposed on the side opposite from the center axial line of the second eccentric section by substantially 180 degrees (175 to 185 degrees, preferably 180 degrees) while interposing the center axial line of the shaft section in the crankshaft described above.

Such crankshaft allows the weight balance with respect to the center axial line of the crankshaft to be laterally equalized and a swing of the crankshaft that may be otherwise caused by the weight unbalance to be prevented (suppressed) in processing the crankshaft.

Thereby, it becomes possible to improve the processability of the crankshaft, to process the crankshaft accurately, to improve the performance and reliability and to reduce the processing cost.

According to a second aspect of the invention, a fluid machine comprises the crankshaft of the first aspect.

According to the fluid machine of the second aspect of the invention, it is possible to readily and quickly assemble (attach) the motor rotor to the shaft section of the crankshaft just by inserting the end of the side on which the eccentric section is formed so that its peripheral edge is positioned radially inside of the peripheral edge of the shaft section from one opening end of a center hole perforated through a center of the motor rotor for example.

Thereby, it is possible to simplify the assembly process, to shorten the work hours required for the assembly process and to reduce the manufacturing cost.

According to a third aspect of the invention, a fluid machine includes an electric motor driving a crankshaft provided with first and second eccentric sections at each end thereof while interposing a shaft section therebetween within a closed housing and a compression mechanism or an expansion mechanism is driven by the crankshaft through the first eccentric section and the compression mechanism or the expansion mechanism is driven by the crankshaft through the second eccentric section, wherein the first/second eccentric section has such a shape that their peripheral edge is positioned radially inside of a peripheral edge of the shaft section.

According to the fluid machine of the third aspect of the invention, it is possible to readily and quickly assemble (attach) the motor rotor to the shaft section of the crankshaft just by inserting the end of the side on which the eccentric section is formed so that its peripheral edge is positioned radially inside of the peripheral edge of the shaft section from one opening end of a center hole perforated through a center of the motor rotor for example.

Thereby, it is possible to simplify the assembly process, to shorten the work hours required for the assembly process and to reduce the manufacturing cost.

Still more, according to the fluid machine of the third embodiment of the invention, because the crankshaft is made monolithically, it is possible to prevent the strength of the crankshaft from dropping.

Furthermore, according to the fluid machine of the third embodiment of the invention, because the crankshaft is made monolithically and causes no decentering, it is possible to eliminate a drop of performance and reliability that are otherwise caused by the decentering.

In the fluid machine described above, preferably a sleeve is disposed between the first/second eccentric section having the peripheral edge positioned radially inside of the peripheral edge of the shaft section and the compression/expansion mechanism.

According to the fluid machine arranged as described above, it is possible to artificially increase the diameter of the first/second eccentric section, i.e., to increase the diameter of the eccentric bearing, so that the reliability of the eccentric bearing may be improved.

In the fluid machine described above, preferably the sleeve is constructed so as to function as an orbiting radius variable mechanism.

According to the fluid machine arranged as described above, it is possible to reduce a leakage of the gaseous refrigerant compressed or expanded by the fixed scroll or the orbiting scroll and to improve the compression or expansion performance when the compression mechanism/the expansion mechanism is a type of scroll for example.

In the fluid machine described above, preferably an angle formed between a line connecting a center axial line of the first eccentric section and a center axial line of the shaft section and a line connecting a center axial line of the second eccentric section and the center axial line of the shaft section is set so as to be substantially zero degree (±5 degrees, preferably zero degree) within a same plane.

Such fluid machine arranged as described above allows a dynamic balance of its shaft system to be readily balanced and a swing of the crankshaft that may be otherwise caused by its dynamic unbalance to be prevented in processing the crankshaft.

Thereby, it becomes possible to improve the processability of the crankshaft, to process the crankshaft accurately, to improve the performance and reliability and to reduce the processing cost.

In the fluid machine described above, preferably the center axial line of the first eccentric section is disposed on the side opposite from the center axial line of the second eccentric section by substantially 180 degrees (175 to 185 degrees, preferably 180 degrees) while interposing the center axial line of the shaft section.

Such fluid machine arranged as described above allows the weight balance with respect to the center axial line of the crankshaft to be laterally equalized and a swing of the crankshaft that may be otherwise caused by the weight unbalance to be prevented (suppressed) in processing the crankshaft.

Thereby, it becomes possible to improve the processability of the crankshaft, to process the crankshaft accurately, to improve the performance and reliability and to reduce the processing cost.

In the fluid machine described above, preferably the compression mechanism has a stepped scroll structure that compresses fluid in the radial and height directions.

According to the fluid machine arranged as described above, it is possible to discharge (supply) gaseous refrigerant having higher compression ratio because the gaseous refrigerant is compressed not only in the radial direction but also in the height direction.

Still more, it is possible to reduce an eccentricity of the eccentric section when it is not necessary to increase the compression ratio of the discharged gaseous refrigerant. Accordingly, it is possible to reduce a swing of the crankshaft in turning the crankshaft and hence to improve its performance and reliability.

According to a fourth aspect of the invention, a fluid machine includes an electric motor driving a crankshaft provided with first and second eccentric sections at each end thereof interposing a shaft section within a closed housing and a compression mechanism or an expansion mechanism is driven by the crankshaft through the first eccentric section and the compression mechanism or the expansion mechanism is driven by the crankshaft through the second eccentric section, wherein a motor rotor that composes the electric motor and that is attached to the shaft section has a partial structure divided along a turning axial line of the shaft section.

According to the fluid machine of the fourth aspect of the invention, the motor rotor may be assembled (attached) to the shaft section of the crankshaft by assembling the divided motor rotors so as to sandwich the shaft section of the crankshaft without inserting the end of the side of the crankshaft on which the eccentric section is formed such that the peripheral edge thereof is positioned radially inside of the peripheral edge of the eccentric section from one opening end of the center hole perforated through the center of the motor rotor.

Thereby, it is possible to prevent the inner peripheral face of the motor rotor (i.e., the surface of the center hole) from being damaged by the end of the crankshaft in assembling (attaching) the motor rotor to the shaft section of the crankshaft.

Still more, even if the eccentric section is projecting, the motor rotor may be readily attached to the shaft section of the crankshaft.

Accordingly, the invention brings about the effect that it is possible to simplify the assembly process, to shorten the work hours required for the assembly process and to reduce the manufacturing cost.

DETAILED DESCRIPTION OF THE INVENTION

Figure 1:
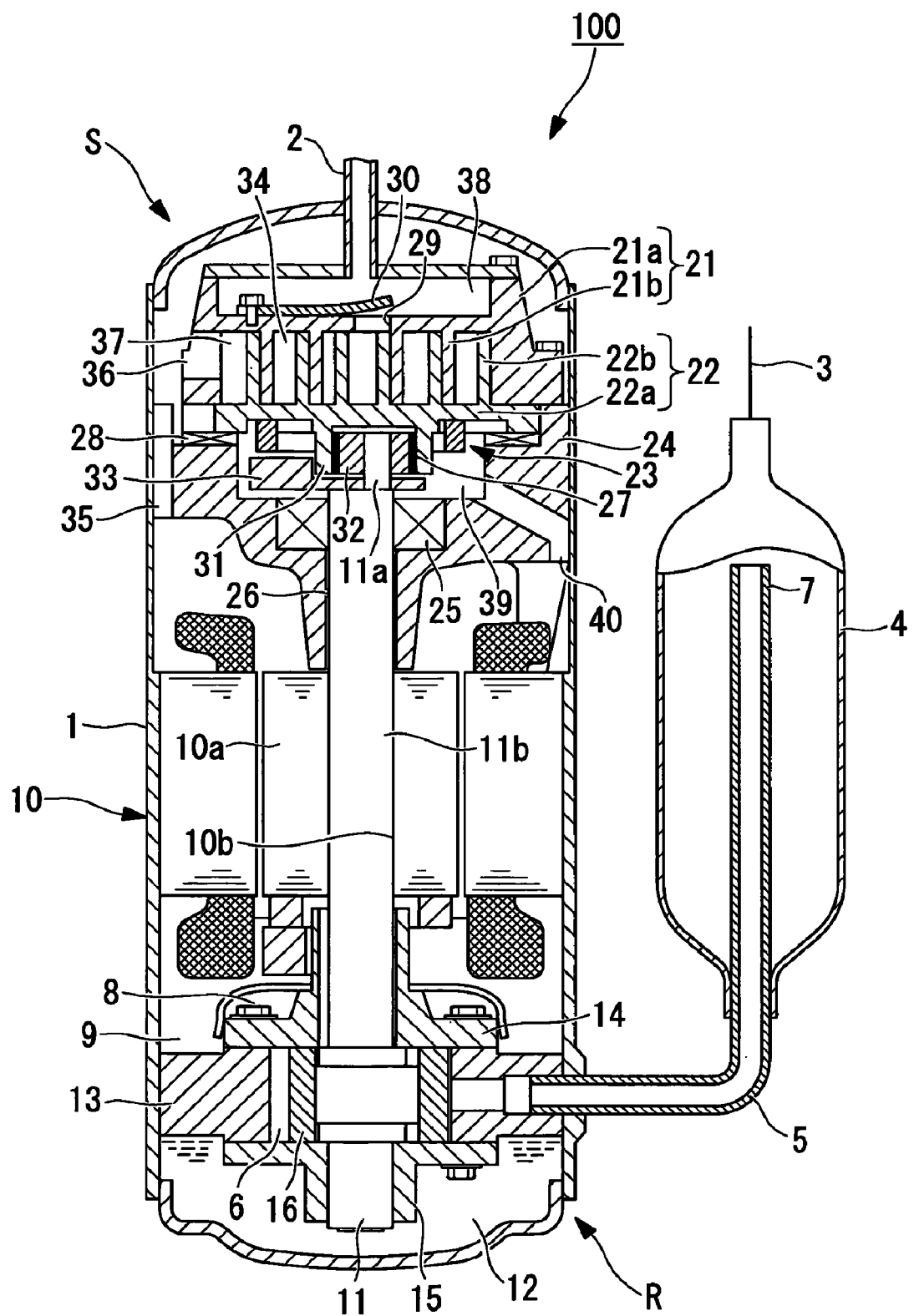
FIG. 1 is a schematic longitudinal section view of a two-stage compressor of a first embodiment of the invention.
Figure 2:
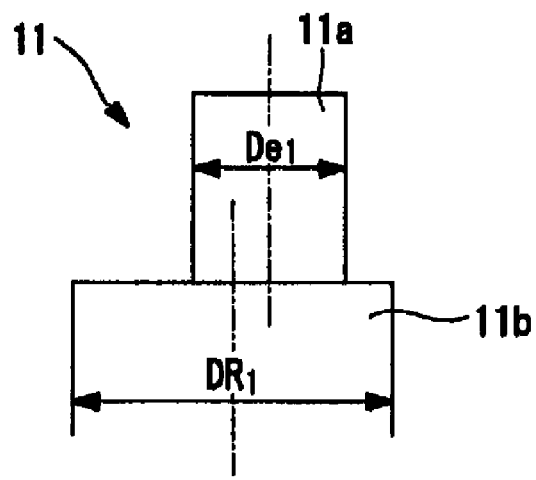
FIG. 2 is an enlarged view of a main part of FIG. 1.

A first embodiment of a fluid machine of the invention will be explained below with reference to FIGS. 1 and 2. FIG. 1 is a schematic longitudinal section view of the fluid machine of a first embodiment of the invention and FIG. 2 is an enlarged view of a main part of FIG. 1.

The fluid machine (referred to as a "two-stage compressor" hereinafter) 100 of the embodiment is what stores a rolling piston type compression mechanism R in a lower part of a closed housing 1 and a scroll type compression mechanism S in an upper part of the closed housing 1.

In FIG. 1, the closed housing 1 is provided with a discharge pipe 2 for leading compressed refrigerant gas therein to the outside at the upper part thereof. The discharge pipe 2 is connected sequentially with a condenser, a throttle mechanism, an evaporator (not shown) and an accumulator 4 via a refrigerant pipe 3 and communicates with a cylinder chamber 6 within the closed housing 1 via an intake pipe 5. It is noted that a reference numeral 7 in FIG. 1 is an inlet of the intake pipe 5 within the accumulator 4.

When an electric motor 10 is driven, gaseous refrigerant taken into the cylinder chamber 6 from the inlet port 7 through the intake pipe 5 is compressed in the rolling piston type compression mechanism R and is discharged to a discharge cavity 8. After that, the compressed refrigerant is guided to a space 9 within the closed housing 1 and to the scroll type compression mechanism S while passing around the electric motor 10. It is noted that reference numerals (11) denotes the crankshaft, (12) a lubricant oil reservoir formed at the bottom of the closed housing 1, (13) a cylinder body, (14) an upper bearing, (15) a lower bearing and (16) a rotor. The cylinder chamber 6 that becomes a compressed space is formed by the cylinder body 13, the upper bearing 14, the lower bearing 15 and the rotor 16.

The scroll type compression mechanism S has a fixed scroll 21, an orbiting scroll 22, a rotation blocking mechanism 23 such as an Oldham's ring that blocks rotation movement of the orbiting scroll 22 round its axis, though it permits orbiting motion of the orbiting scroll 22 round a center of the fixed scroll 21, a frame 24 that fastens the fixed scroll 21 and the electric motor 10, an upper bearing 25 and a lower bearing 26 that support the crankshaft 11 and an orbiting bearing 27 and a thrust bearing 28 that support the orbiting scroll 22.

The fixed scroll 21 has an end plate 21a and a spiral wall 21b provided so as to erect from an inner face of the end plate 21a. The end plate 21a is provided with a discharge port 29 and a discharge valve 30 that opens/closes the discharge port 29.

The orbiting scroll 22 has an end plate 22a and a spiral wall 22b provided so as to erect from an inner face of the end plate 22a and a drive bush 32 is rotably fitted into a boss 31 provided so as to erect from an outer face of the end plate 22a through an intermediary of an orbiting bearing 27. An eccentric pin (first eccentric section) 11a that protrudes from an upper end of the crankshaft 11 is rotably fitted into an eccentric hole perforated through the drive bush 32. Furthermore, a balance weight 33 for balancing dynamic unbalance of the orbiting scroll 22 is attached to the upper end of the crankshaft 11.

Then, a plurality of closed spaces 34 is formed by the fixed scroll 21 engaged with the orbiting scroll 22 so that their centers deviate from each other by an orbiting radius and so that their positions deviate from each other by an angle of substantially 180 degrees (175 to 185 degrees, preferably 180 degrees).

When the electric motor 10 is driven, the orbiting scroll 22 is driven through a driving mechanism such as the crankshaft 11, the eccentric pin 11a, the drive bush 32, the boss 31 and others in the scroll type compression mechanism S and the orbiting scroll 22 orbits round the center of the fixed scroll 21 on a circular orbit of the radius of the rotation while being blocked from rotating round the its axis. Then, after cooling the electric motor 10, the gaseous refrigerant that has risen by passing around the electric motor 10 is suctioned into the closed space 34 by passing through a passage 35 perforated through the frame 24 and through an intake passage 36 and an intake chamber 37. Then, the refrigerant comes to a center of the orbiting scroll 22 while being compressed by the orbiting scroll 22 that reduces a volume of the closed space 34 by its orbiting motion, enters the discharge cavity 38 from the discharge port 29 by pushing and opening the discharge valve 30 and is then discharged to the outside via the discharge pipe 2.

In the same time, lubricant oil stored within the lubricant oil reservoir 12 formed at the bottom within the closed housing 1 is suctioned up by a centrifugal pump (not shown) provided at the lower part within the crankshaft 11, passes through an oil supplying hole (not shown) and drops to the lubricant oil reservoir 12 to be stored within the lubricant oil reservoir 12 again through a balance weight chamber 39 and a drain oil hole 40 after lubricating the lower bearing 26, the eccentric pin 11a, the upper bearing 25, the rotation blocking mechanism 23, the orbiting bearing 27, the thrust bearing 28 and others.

By the way, the eccentric pin 11a of the present embodiment is provided so that a peripheral edge thereof (a profile of an outer peripheral face drawn in a horizontal projection plane) is positioned on the inside (radially inside) more than a peripheral edge (a profile of an outer peripheral face drawn in a horizontal projection plane) of the shaft section 11b of the crankshaft 11, i.e., so that the eccentric pin 11a is provided so as to protrude upward from the upper end face of the shaft section 11b so that the peripheral edge of the eccentric pin 11a does not stretch (protrude) out of the peripheral edge of the shaft section 11b when the upper end faces of the eccentric pin 11a and the shaft section 11b are noticed.

According to the two-stage compressor 100 of the present embodiment, it is possible to readily and quickly assemble (attach) the motor rotor 10a of the electric motor 10 to the shaft section 11b of the crankshaft 11 just by inserting one end of the crankshaft 11 (the upper end in FIG. 1) where the eccentric pin 11a is formed from one opening end (lower part in FIG. 1) of the center hole 10b perforated through the motor rotor 10a.

Thereby, it is possible to simplify the assembling process and to shorten the work hours required for the assembling process, so that it is possible to reduce the manufacturing cost.

It is also possible to prevent the strength of the crankshaft 11 from dropping because the crankshaft 11 is made as a monolithic part.

Furthermore, it is possible to eliminate a drop of performance and reliability that may be otherwise caused by decentering because the crankshaft 11 is made as the monolithic part and hence causes no decentering.

Figure 3:
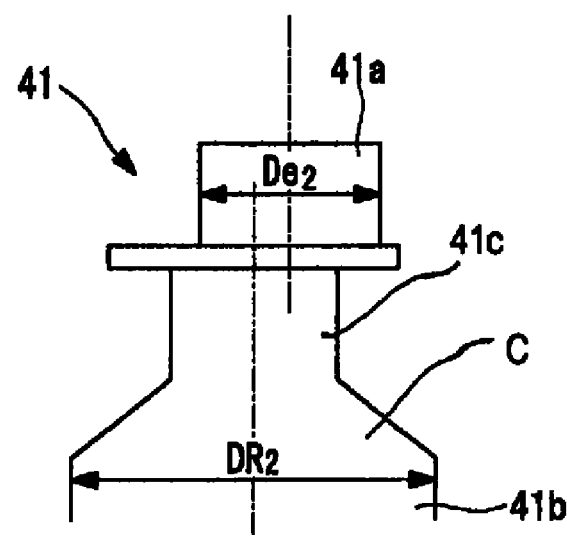
FIG. 3 is an enlarged view of the two-stage compressor of a second embodiment of the invention, similar to FIG. 2.

A second embodiment of the two-stage compressor of the invention will be explained with reference to FIG. 3. FIG. 3 is an enlarged view of the two-stage compressor of the second embodiment of the invention, similar to FIG. 2.

The two-stage compressor of the present embodiment is different from that of the first embodiment described above in that it is provided with a crankshaft 41 instead of the crankshaft 11.

It is noted that the other components are the same with those of the first embodiment described above, so that their explanation will be omitted here.

The crankshaft 41 of the present embodiment has such a shape that an outer diameter De2 of an eccentric pin (first eccentric section) and an outer diameter DR2 of a shaft section 41b are larger than the outer diameter De1 of the eccentric pin 11a and the outer diameter DR1 of the shaft section 11b of the first embodiment described above.

According to the two-stage compressor of the present embodiment, the outer diameter De2 of the eccentric pin 41a, i.e., the outer diameter of the eccentric bearing may be enlarged, so that the reliability of this eccentric bearing may be improved.

A conical section C, as shown in FIG. 3, connects shaft section 41b to shaft section 41c.

The other operations and effects are the same with those of the first embodiment described above, so that their explanation will be omitted here.

Figure 4:
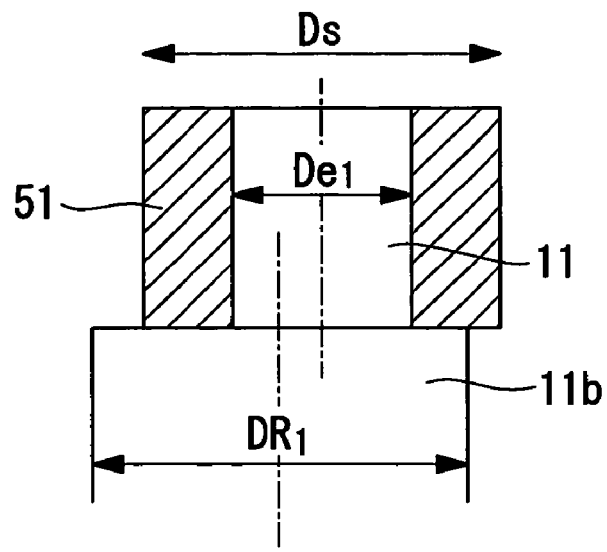
FIG. 4 is an enlarged view of the two-stage compressor of a third embodiment of the invention, similar to FIG. 2.
Figure 5:
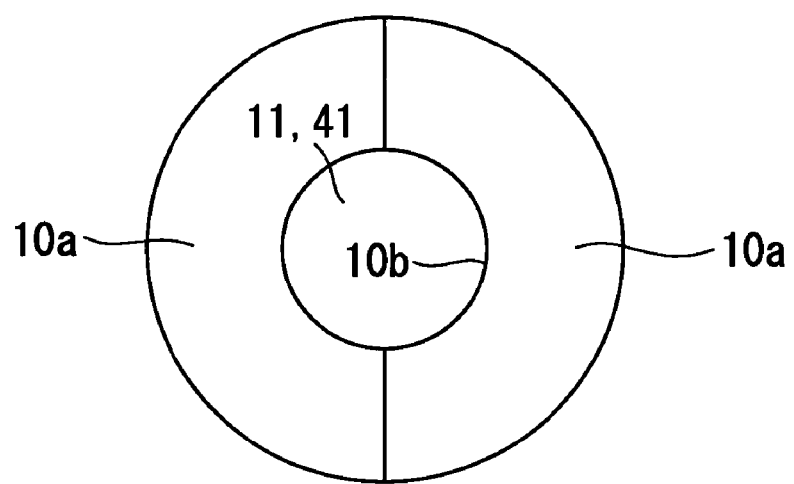
FIG. 5 is an enlarged view of a main part of the two-stage compressor of another embodiment of the invention.

A third embodiment of the two-stage compressor of the invention will be explained with reference to FIG. 4. FIG. 4 is an enlarged view of the two-stage compressor of the third embodiment of the invention, similar to FIG. 2.

The two-stage compressor of the present embodiment is different from that of the first embodiment described above in that it is provided with a sleeve 51 between the eccentric pin 11a and the drive bush 32 (see FIG. 1) or more specifically between the outer peripheral face of the eccentric pin 11a and the inner peripheral face of the drive bush 32.

It is noted that the other components are the same with those of the first embodiment described above, so that their explanation will be omitted here and the same or corresponding members with those of the first embodiment described above will be denoted by the same reference numerals in FIG. 4.

The sleeve 51 has such a shape that its inner diameter is substantially equal to the outer diameter De1 of the eccentric pin 11a and its outer diameter Ds is substantially equal to the outer diameter De2 of the eccentric pin 41a as explained in the second embodiment. Furthermore, the sleeve 51 is fixed so as to surround the outer periphery of the eccentric pin 11a by press-fitting or shrinkage-fitting.

According to the two-stage compressor of the present embodiment, it is possible to artificially enlarge the diameter De2 of the eccentric pin 11a by disposing a sleeve 51 between the eccentric pin 11a and the drive bush 32 (see FIG. 1), i.e., to enlarge the diameter of the eccentric bearing, so that the reliability of this eccentric bearing may be improved.

The other operations and effects are the same with those of the first embodiment described above, so that their explanation will be omitted here.

It is more preferable to construct the sleeve 51 so as to function as a slider type or swing-link type orbiting radius variable mechanism in the present embodiment. It is noted that in this case, the sleeve 51 is constructed so as to be slidable to the outer periphery of the eccentric pin 11a. That is, it becomes unnecessary to press-fit or to shrinkage-fit to fix the sleeve 51 to the outer periphery of the eccentric pin 11a.

Thereby, it is possible to reduce a leakage of the gaseous refrigerant compressed by the fixed scroll 21 and the orbiting scroll 22 of the scroll type compression mechanism S and to improve the compressing performance (compression efficiency).

It is noted that the invention is not limited to the embodiments described above and is more preferable when the motor rotor 10a is divided into two parts along the rotation axial line of the crankshaft 11 or 41.

According to the two-stage compressor of the present embodiment, the motor rotor 10a may be assembled (attached) to the shaft section 11b (41b) of the crankshaft 11 (41) by combining the divided motor rotors 10a so as to sandwich the shaft section 11b (41b) of the crankshaft 11 (41) without inserting one end (upper end in FIG. 1) of the crankshaft 11 (41) where the eccentric pin 11a (41a) is formed from one (under part in FIG. 1) opening end of the center hole 10b perforated through the center of the motor rotor 10a in mounting them.

Thereby, it is possible to prevent the inner peripheral face of the motor rotor 10a (i.e., the surface of the center hole 10b) from being damaged by one end of the crankshaft 11 (41) in assembling (attaching) the motor rotor 10a to the shaft section 11b (41b) of the crankshaft 11 (41).

It is also possible to adopt a crankshaft in which a peripheral edge of an eccentric pin is positioned outside (radially outside) of a peripheral edge of a shaft section, i.e., the peripheral edge of the eccentric pin extends (protrudes) to the outside of the peripheral edge of the shaft section when the upper ends of the eccentric pin and shaft section are seen.

Figure 6:
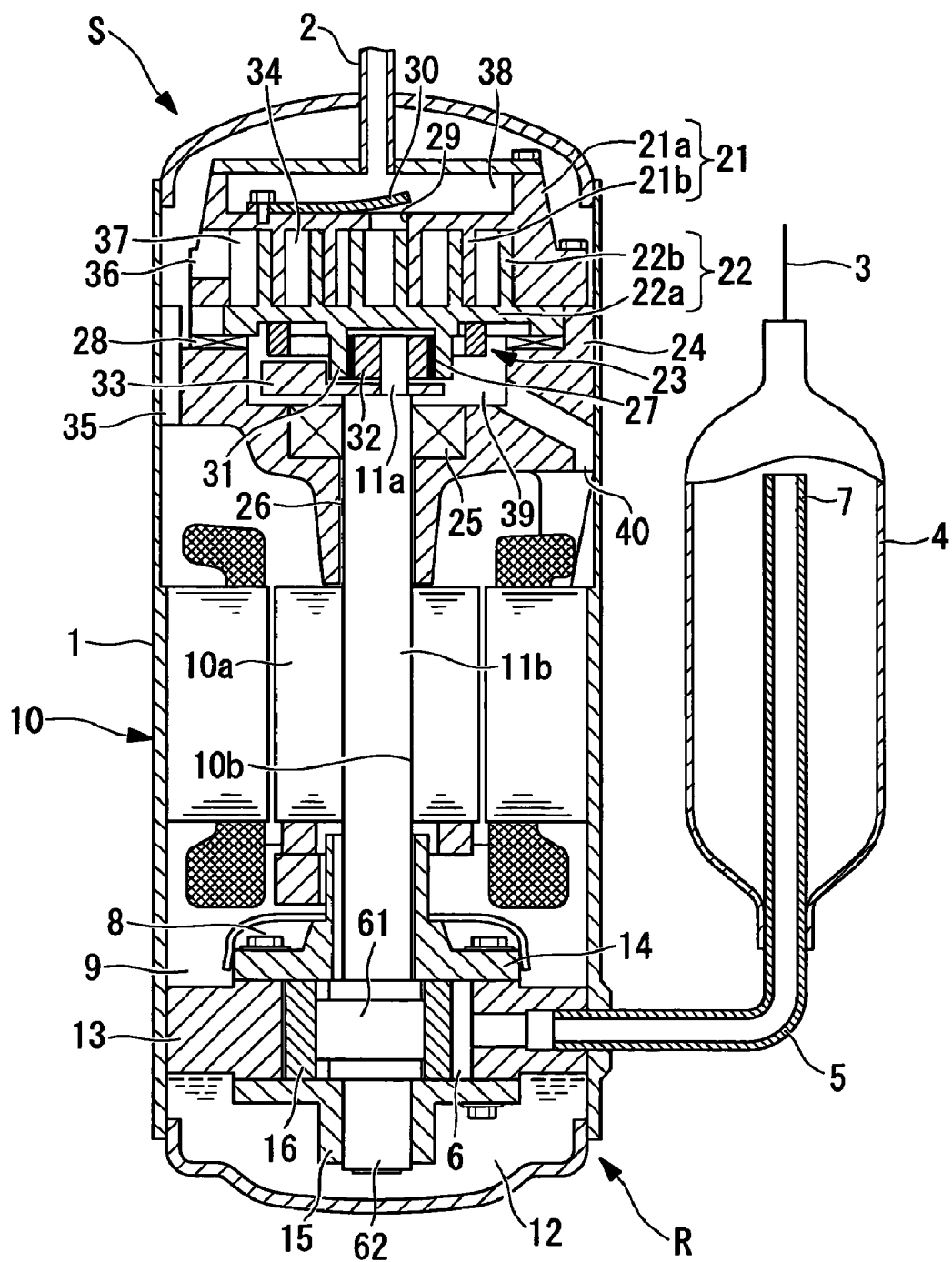
FIG. 6 is a schematic longitudinal section view of the two-stage compressor of the other embodiment of the invention.

Preferably, the embodiments described above also have a crankshaft 62 in which the eccentric pin 11a (41a) provided at one end of the crankshaft 11 (41) is positioned on the side opposite from an eccentric section (second eccentric section) 61 provided at another end of the crankshaft 11 (41) by about 180 degrees (175 to 185 degrees, more preferably 180 degrees) as shown in FIG. 6 for example, i.e., a center axial line of the eccentric pin 11a (41a) is positioned on the side opposite from a center axial line of the eccentric section 61 while interposing a center axial line of the shaft section 11b (41b) therebetween.

According to the two-stage compressor of the present embodiment, a weight balance of the crankshaft 62 with respect to the center axial line is laterally equalized, so that it becomes possible to prevent (suppress) the crankshaft 62 from swinging due to unbalance of the weight in processing the crankshaft 62.

Thereby, it becomes possible to improve the processability of the crankshaft 62, to process the crankshaft accurately, to improve its compression performance (compression efficiency) and reliability and to reduce its processing cost.

Furthermore, the embodiments described above are more preferable to have a so-called stepped scroll structure (also referred to as a "3D scroll structure") in which the fixed scroll 21 and the orbiting scroll 22 in the scroll type compression mechanism S can compress the gaseous refrigerant.

According to the two-stage compressor of the present embodiment, it is possible to discharge (supply) the gaseous refrigerant having a higher compression ratio because the gaseous refrigerant is compressed not only in the radial direction but also in the height direction.

Still more, because a wall height may be increased as compared to the conventional scroll structure, an eccentricity of the eccentric pin 11a (41a) may be reduced. Accordingly, it becomes possible to reduce swing of the crankshaft 11 (41) in turning the crankshaft 11 (41) and to improve the compression performance (compression efficiency) and the reliability.

Still more, although the two-stage compressor in which the rolling piston type compression mechanism R is stored in the lower part of the closed housing 1 and the scroll type compression mechanism S is stored in the upper part of the closed housing 1 has been explained as one concrete example of the fluid machine in the embodiments described above, the invention is not limited to this and one or both compression mechanisms may be replaced with an expansion mechanism that generates dynamic power by expanding fluid.

Preferably, the embodiments described above have the eccentric pin 11a (41a) provided at one end of the crankshaft 11 (41) and the eccentric section 61 provided at the other end of the crankshaft 11 (41) are set on the same side, i.e., so that an angle formed between a line connecting the center axial line of the eccentric pin 11a (41a) and the shaft section 11b (41b) and a line connecting the center axial line of the eccentric section 61 and the center axial line of the shaft section 11b (41b) is substantially zero degree (±5 degrees, preferably zero degree) within a same plane.

According to the two-stage compressor of the present embodiment, it becomes easy to balance the dynamic balance of the shaft system and to prevent (suppress) swing of the crankshaft that is otherwise caused by the dynamic unbalance during processing the crankshaft.

Thereby, it becomes possible to improve the processability of the crankshaft 62, to process the crankshaft accurately, to improve its compression performance (compression efficiency) and reliability and to reduce its processing cost.

Figure 7:
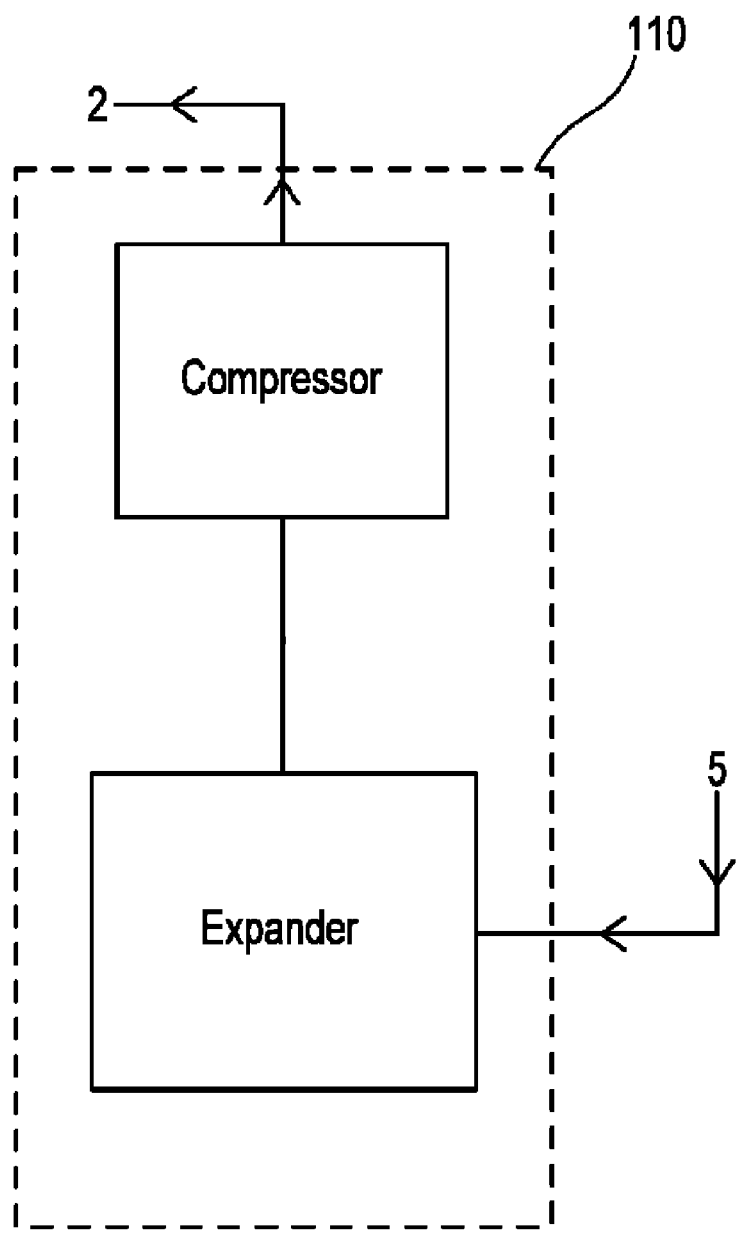
FIG. 7 is a box diagram of a compressor and expander in a fourth embodiment.

FIG. 7 shows a two-stage compressor 110 which includes an expander and compressor.

Figure 8:
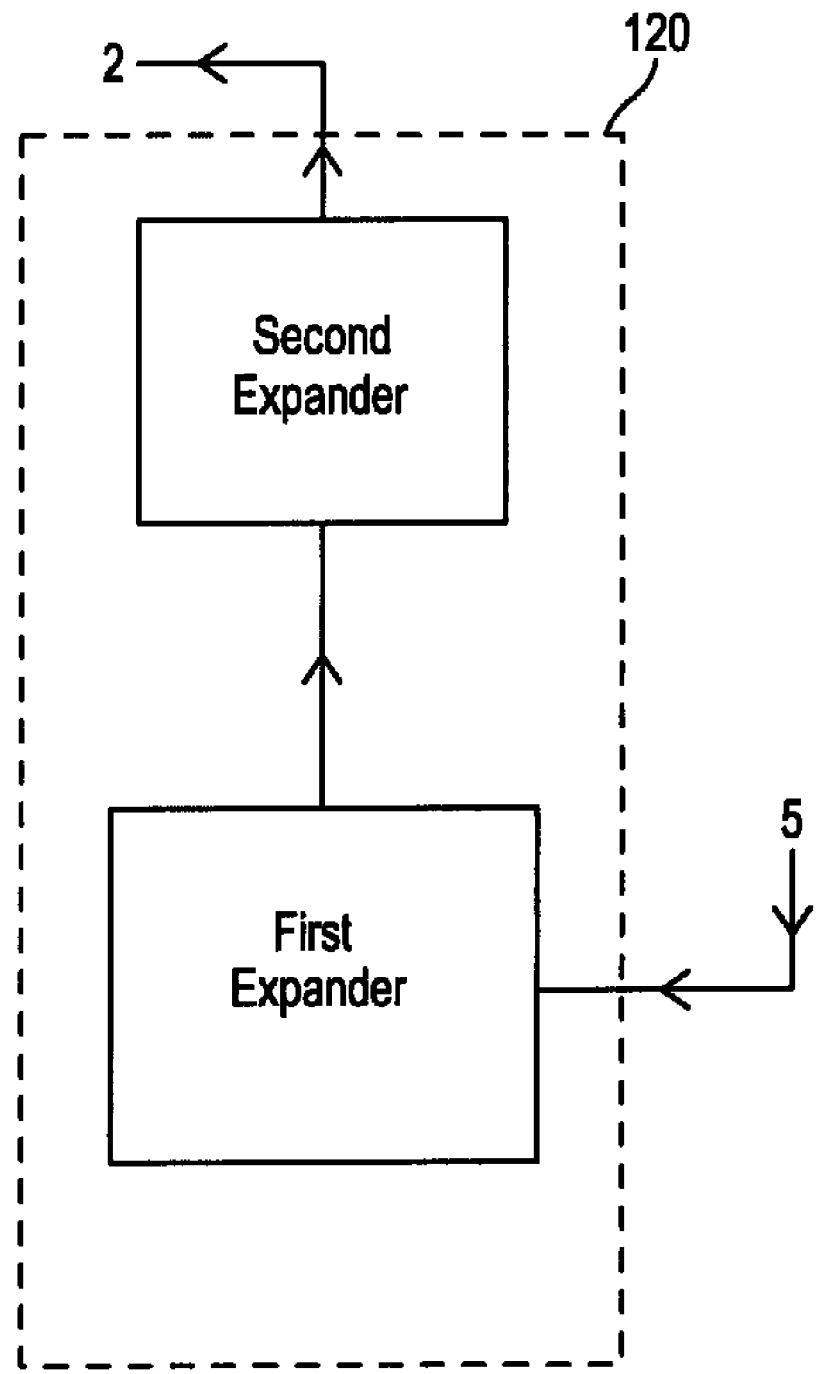
FIG. 8 is a box diagram of a first and second expander in a fifth embodiment.

FIG. 8 shows a two-stage compressor 120 which includes a first expander and a second expander.

What is claimed is:

1. A crankshaft provided with first and second eccentric sections at respective ends while interposing a shaft section therebetween wherein
    central axes of the first and second eccentric sections are radially shifted in the same direction with respect to a central axis of the shaft section;
    the first and second eccentric sections are formed integrally with the shaft section;
    an entirety of a peripheral edge of the first eccentric section is positioned radially inside of a peripheral edge of the shaft section; and
    the first eccentric section has a diameter larger than an adjacent section of the crankshaft near its end, and the first eccentric section is attached to a main section of the crankshaft by a conical part.

2. A fluid machine comprising the crankshaft described in claim 1.

3. A fluid machine comprising:
    a crankshaft provided with first and second eccentric sections at each end thereof while interposing a shaft section therebetween within a closed housing, wherein
    the fluid machine comprises either a compression mechanism and an expansion mechanism or two compression mechanisms;
    central axes of the first and second eccentric sections are radially shifted in the same direction with respect to a central axis of the shaft section;
    the first and second eccentric sections are formed integrally with the shaft section;
    the crankshaft drives said compression and expansion mechanism or said two compression mechanisms;
    an entirety of a peripheral edge of the first eccentric section is positioned radially inside of a peripheral edge of the shaft section; and
    the first eccentric section has a diameter larger than an adjacent section of the crankshaft near its end, and the first eccentric section is attached to a main section of the crankshaft by a conical part.

* * * * *